United States Patent
Du et al.

(10) Patent No.: US 10,681,045 B2
(45) Date of Patent: Jun. 9, 2020

(54) MULTI-TTP-BASED METHOD AND DEVICE FOR VERIFYING VALIDITY OF IDENTITY OF ENTITY

(71) Applicant: China IWNCOMM Co., LTD., Xi'an, Shaanxi (CN)

(72) Inventors: Zhiqiang Du, Shaanxi (CN); Bianling Zhang, Shaanxi (CN); Qin Li, Shaanxi (CN); Zhenhai Huang, Shaanxi (CN); Qiang Zhang, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 258 days.

(21) Appl. No.: 15/766,332

(22) PCT Filed: Aug. 26, 2016

(86) PCT No.: PCT/CN2016/096940
§ 371 (c)(1),
(2) Date: Apr. 5, 2018

(87) PCT Pub. No.: WO2017/059753
PCT Pub. Date: Apr. 13, 2017

(65) Prior Publication Data
US 2018/0295132 A1    Oct. 11, 2018

(30) Foreign Application Priority Data
Oct. 10, 2015   (CN) .......................... 2015 1 0654781

(51) Int. Cl.
*H04L 29/06* (2006.01)
*H04L 9/32* (2006.01)

(52) U.S. Cl.
CPC ........ *H04L 63/0869* (2013.01); *H04L 9/3213* (2013.01); *H04L 9/3247* (2013.01); *H04L 9/3268* (2013.01); *H04L 63/126* (2013.01)

(58) Field of Classification Search
CPC ..... H04W 12/02; H04W 12/06; H04W 76/12; H04W 88/16
See application file for complete search history.

(56) References Cited

U.S. PATENT DOCUMENTS

2006/0013389 A1   1/2006  Harrison et al.
2010/0262832 A1  10/2010  Tie et al.
(Continued)

FOREIGN PATENT DOCUMENTS

CN   101378318 A   3/2009
CN   101640593 A   2/2010
(Continued)

OTHER PUBLICATIONS

International Search Report for Application No. PCT/CN2016/096940 dated Nov. 30, 2016.
(Continued)

*Primary Examiner* — Jeffrey C Pwu
*Assistant Examiner* — Thong P Truong
(74) *Attorney, Agent, or Firm* — Wolf, Greenfield & Sacks, P.C.

(57) ABSTRACT

Provided are an entity identity validity verification method and device with multiple trusted third parties being involved. In the application, validity of identities of entities performing mutual identity validity verification can only be verified by different trusted third parties. During the verification process, the trusted third parties that are respectively trusted by the two entities interact with each other, and provide services for mutual identity validity verification between the entities, to complete the identity validity verification between the entities.

20 Claims, 3 Drawing Sheets

(56) References Cited

U.S. PATENT DOCUMENTS

2012/0159169 A1    6/2012  Lai et al.
2012/0198240 A1*   8/2012  Tie .................. H04L 9/3213
                                              713/176

FOREIGN PATENT DOCUMENTS

| CN | 101674182 A     |   | 3/2010  |         |
|----|-----------------|---|---------|---------|
| EP | 2 128 781 A1    |   | 12/2009 |         |
| EP | 2472770 A1      |   | 7/2012  |         |
| GB | 2416282 A       |   | 1/2006  |         |
| JP | H11-316543 A    |   | 11/1999 |         |
| JP | 2003-087242 A   |   | 3/2003  |         |
| JP | 2011-507363 A   |   | 3/2011  |         |
| WO | WO-2014075011 A1| * | 5/2014  | ........... G06Q 20/206 |

OTHER PUBLICATIONS

Office Action for Japanese Application No. 2018-517742, dated Jan. 30, 2019.
Extended European Search Report dated Jun. 11, 2018 in connection with European Application No. 16853058.2.

* cited by examiner

US 10,681,045 B2

MULTI-TTP-BASED METHOD AND DEVICE FOR VERIFYING VALIDITY OF IDENTITY OF ENTITY

The present application is a national phase application of PCT international patent application PCT/CN2016/096940, filed on Aug. 26, 2016 which claims priority to Chinese Patent Application No. 201510654781.0, titled "MULTI-TTP-BASED METHOD AND DEVICE FOR VERIFYING VALIDITY OF IDENTITY OF ENTITY", filed on Oct. 10, 2015 with the Chinese State Intellectual Property Office, both of which applications are incorporated herein by reference in their entireties.

FIELD

The present disclosure relates to methods and devices for entity identity validity verification, and in particular to an entity identity validity verification method with multiple trusted third parties being involved and devices therefor.

BACKGROUND

Among methods for identity validity verification between entities, there is a type of method in which a trusted third party TTP is required to be involved and to provide verification services. In such method, a TTP that can be trusted by both identity validity verification parties is used to provide verification services for both parties being involved in identity validity verification and feed verification results back to both entities being involved in identity validity verification, thereby helping complete mutual identity validity verification between the entities. However, those skilled in the art cannot be instructed to complete identity validity verification in some specific environments with the method. For example, the specific identity validity verification environment may include a case where mutual identity validity verification is required to be performed between the entities that respectively trust different trusted third parties TTPs and the trusted third parties are required to be involved and to provide verification services. Therefore, it is desired to provide an entity identity validity verification method to solve the problem.

SUMMARY

In order to solve the problem mentioned in the background part, an entity identity validity verification method with two TTPs being involved is provided according to the present disclosure, to provide services for mutual identity validity verification between an entity A and an entity B.

An entity identity validity verification method with multiple TTPs being involved, is provided. The method involves an entity A, an entity B, a trusted third party $TTP_A$ and a trusted third party $TTP_B$. The $TTP_A$ is capable of verifying validity of an identity of the entity A, the $TTP_B$ is capable of verifying validity of an identity of the entity B, the entity A trusts the $TTP_A$, and the entity B trusts the $TTP_A$ and the $TTP_B$. The method includes:

step 1) transmitting, by the entity B, a message 1 to the entity A, where the message 1 includes identity information $I_B$ of the entity B and a random number $R_B$ generated by the entity B;

step 2) transmitting, by the entity A, a message 2 to the trusted third party $TTP_A$ after the entity A receives the message 1, where the message 2 includes identity information $I_A$ of the entity A, a random number $R_A$ generated by the entity A, the identity information $I_B$ of the entity B, and the random number $R_B$;

step 3) after the trusted third party $TTP_A$ receives the message 2 transmitted by the entity A, verifying, by the trusted third party $TTP_A$, the identity of the entity A based on $I_A$, and transmitting, by the trusted third party $TTP_A$, a message 3 to the trusted third party $TTP_B$, where the message 3 includes $I_B$ and a random number $R_{TPA}$ generated by the $TTP_A$;

step 4) after the $TTP_B$ receives the message 3 transmitted by the $TTP_A$, verifying, by the $TTP_B$, the identity of the entity B based on $I_B$, and transmitting, by the $TTP_B$, a message 4 to the $TTP_A$, where the message 4 includes a token TokenTPBA, TokenTPBA includes $Res_B$, and a first signature of the $TTP_B$, $Res_B$ is a verification result of verifying the entity B by the $TTP_B$, and signature objects of the first signature of the $TTP_B$ include $R_{TPA}$ and $Res_B$;

step 5) after the $TTP_A$ receives the message 4 transmitted by the $TTP_B$, verifying, by the $TTP_A$, the first signature of the $TTP_B$ in TokenTPBA; after the first signature of the $TTP_B$ passes the verification performed by the $TTP_A$, checking, by the $TTP_A$, whether $R_{TPA}$ acquired from the message 4 is the same as the random number $R_{TPA}$ in the message 3 transmitted by the $TTP_A$ to the $TTP_B$; if $R_{TPA}$ acquired from the message 4 is the same as the random number $R_{TPA}$ in the message 3 transmitted by the $TTP_A$ to the $TTP_B$, constructing a message 5 and transmitting the message 5 to the entity A by the $TTP_A$, where the message 5 includes a token TokenTA, TokenTA includes $Res_A$, $Res_B$, a first signature of the $TTP_A$, and a second signature of the $TTP_A$, $Res_A$ is a verification result of verifying the entity A by the $TTP_A$, signature objects of the first signature of the $TTP_A$ include $Res_B$ and $R_A$, and signature objects of the second signature of the $TTP_A$ include $Res_A$ and $R_B$;

step 6) after the entity A receives the message 5 from the $TTP_A$, verifying, by the entity A, the first signature of the $TTP_A$ in TokenTA; after the first signature of the $TTP_A$ passes the verification performed by the entity A, checking, by the entity A, whether $R_A$ acquired from the message 5 is the same as the random number $R_A$ in the message 2 transmitted by the entity A to the $TTP_A$; if $R_A$ acquired from the message 5 is the same as the random number $R_A$ in the message 2 transmitted by the entity A to the $TTP_A$, determining, by the entity A, the validity of the identity of the entity B based on the verification result $Res_B$, and constructing a message 6 and transmitting the message 6 to the entity B by the entity A, where the message 6 includes $Res_A$, and the second signature of the $TTP_A$; and step 7) after the entity B receives the message 6, verifying, by the entity B, the second signature of the $TTP_A$; after the second signature of the $TTP_A$ passes the verification performed by the entity B, checking, by the entity B, whether $R_B$ acquired from the message 6 is the same as the random number $R_B$ in the message 1 transmitted by the entity B to the entity A; if $R_B$ acquired from the message 6 is the same as the random number $R_B$ in the message 1 transmitted by the entity B to the entity A, determining, by the entity B, the validity of the identity of the entity A based on the verification result $Res_A$.

A first entity identity validity verification device for performing identity validity verification together with a second entity identity validity verification device with a first trusted third party device and a second trusted third party device being involved, is provided. The first entity identity validity verification device includes:

a processing unit configured to generate a random number $R_A$;

a storage unit configured to store identity information $I_A$ of the first entity identity validity verification device; and a transceiving unit configured to:

receive a message 1 transmitted by the second entity identity validity verification device and transmit a message 2 to the first trusted third party device, where the message 1 includes identity information $I_B$ of the second entity identity validity verification device and a random number $R_B$ generated by the second entity identity validity verification device, and the message 2 includes $I_A$, $R_A$, $I_B$ and $R_B$;

receive a message 5 transmitted by the first trusted third party device and transmit a message 6 to the second entity identity validity verification device, where the message 5 includes a token TokenTA, TokenTA includes $Res_A$, $Res_B$, a first signature of the first trusted third party device, and a second signature of the first trusted third party device, $Res_A$ is a verification result of verifying the first entity identity validity verification device by the first trusted third party device, $Res_B$ is a verification result of verifying the second entity identity validity verification device by the second trusted third party device, signature objects of the first signature of the first trusted third party device include $Res_B$ and $R_A$, signature objects of the second signature of the first trusted third party device include $Res_A$ and $R_B$, and the message 6 includes $Res_A$ and the second signature of the first trusted third party device, where the processing unit is further configured to: verify the first signature of the first trusted third party device in TokenTA; check whether $R_A$ acquired from the message 5 is the same as the random number $R_A$ in the message 2 transmitted by the first entity identity validity verification device to the first trusted third party device; determine validity of an identity of the second entity identity validity verification device based on the verification result $Res_B$; and construct the message 6.

A second entity identity validity verification device for performing identity validity verification together with a first entity identity validity verification device with a first trusted third party device and a second trusted third party device being involved, is provided. The second entity identity validity verification device includes:

a processing unit configured to generate a random number $R_B$;

a storage unit configured to store identity information $I_B$ of the second entity identity validity verification device; and a transceiving unit configured to transmit a message 1 and receive a message 6 transmitted by the first entity identity validity verification device, where the message 1 includes $I_B$ and $R_B$, the message 6 includes $Res_A$, and a second signature of the first trusted third party device, $Res_A$ is a verification result of verifying the first entity identity validity verification device by the first trusted third party device, and signature objects of the second signature of the first trusted third party device include $Res_A$ and $R_B$, where the processing unit is further configured to: verify the second signature of the first trusted third party device; check whether $R_B$ acquired from the message 6 is the same as the random number $R_B$ in the message 1 transmitted by the second entity identity validity verification device to the first entity identity validity verification device; and determine validity of an identity of the first entity identity validity verification device based on the verification result $Res_A$.

A first trusted third party device for being involved in identity validity verification between a first entity identity validity verification device and a second entity identity validity verification device together with a second trusted third party device, is provided. The first trusted third party device includes:

a transceiving unit configured to receive a message 2 transmitted by the first entity identity validity verification device, where the message 2 includes identity information $I_A$ of the first entity identity validity verification device, a random number $R_A$ generated by the first entity identity validity verification device, identity information $I_B$ of the second entity identity validity verification device, and a random number $R_B$ generated by the second entity identity validity verification device; and a processing unit configured to verify an identity of the first entity identity validity verification device based on $I_A$, where the transceiving unit is further configured to transmit a message 3 to the second trusted third party device, where the message 3 includes $I_B$ and a random number $R_{TPA}$ generated by the first trusted third party device;

the transceiving unit is further configured to receive a message 4 transmitted by the second trusted third party device, where the message 4 includes a token TokenTPBA, TokenTPBA includes $Res_B$, and a first signature of the second trusted third party device, $Res_B$ is a verification result of verifying the second entity identity validity verification device by the second trusted third party device, and signature objects of the first signature of the second trusted third party device include $R_{TPA}$ and $Res_B$;

the processing unit is further configured to: verify the first signature of the second trusted third party device in TokenTPBA; check whether $R_{TPA}$ acquired from the message 4 is the same as the random number $R_{TPA}$ in the message 3 transmitted by the first trusted third party device to the second trusted third party device; and construct a message 5, where the message 5 includes a token TokenTA, TokenTA includes $Res_A$, $Res_B$, a first signature of the first trusted third party device, and a second signature of the first trusted third party device, $Res_A$ is a verification result of verifying the first entity identity validity verification device by the first trusted third party device, signature objects of the first signature of the first trusted third party device include $Res_B$ and $R_A$, and signature objects of the second signature of the second trusted third party device include $Res_A$ and $R_B$; and the transceiving unit is further configured to transmit the message 5 to the first entity identity validity verification device.

A second trusted third party device for being involved in identity validity verification between a first entity identity validity verification device and a second entity identity validity verification device together with a first trusted third party device, is provided. The second trusted third party device includes:

a transceiving unit configured to receive a message 3 transmitted by the first trusted third party device, where the message 3 includes identity information $I_B$ of the second entity identity validity verification device, and a random number $R_{TPA}$ generated by the first trusted third party device; and a processing unit configured to verify an identity of the second entity identity validity verification device based on $I_B$; where the transceiving unit is further configured to transmit a message 4 to the first trusted third party device, where the message 4 includes a token TokenTPBA, TokenTPBA includes $Res_B$ and a first signature of the second trusted third party device, $Res_B$ is a verification result of verifying the second entity identity validity verification device by the second trusted third party device, and signature objects of the first signature of the second trusted third party device include $R_{TPA}$ and $Res_B$.

In the present disclosure, validity of identities of entities performing mutual identity validity verification can only be verified by different trusted third parties TTPs. During the verification process, the TTPs that are respectively trusted by the two entities interact with each other, and provide services for mutual identity validity verification between the entities, to complete the identity validity verification between the entities. According to the present disclosure, the problem existing in the identity validity verification process in the case where the entities respectively trust different TTPs can be solved.

DETAILED DESCRIPTION OF EMBODIMENTS

The method according to the present disclosure involves entities A and B as well as trusted third parties $TTP_A$ and $TTP_B$. The $TTP_A$ is capable of verifying validity of an identity of the entity A, and the $TTP_B$ is capable of verifying validity of an identity of the entity B. The entity A trusts the $TTP_A$, and the entity B trusts the $TTP_A$ and the $TTP_B$. Connections between the entities and the TTPs in the identity validity verification process according to the present disclosure may be described as follows. The entity B is only connected to the entity A, the entity A is connected to the entity B and the trusted third party $TTP_A$, the trusted third party $TTP_A$ is connected to the entity A and the trusted third party $TTP_B$, and the trusted third party $TTP_B$ is only connected to the trusted third party $TTP_A$.

Figure 1:
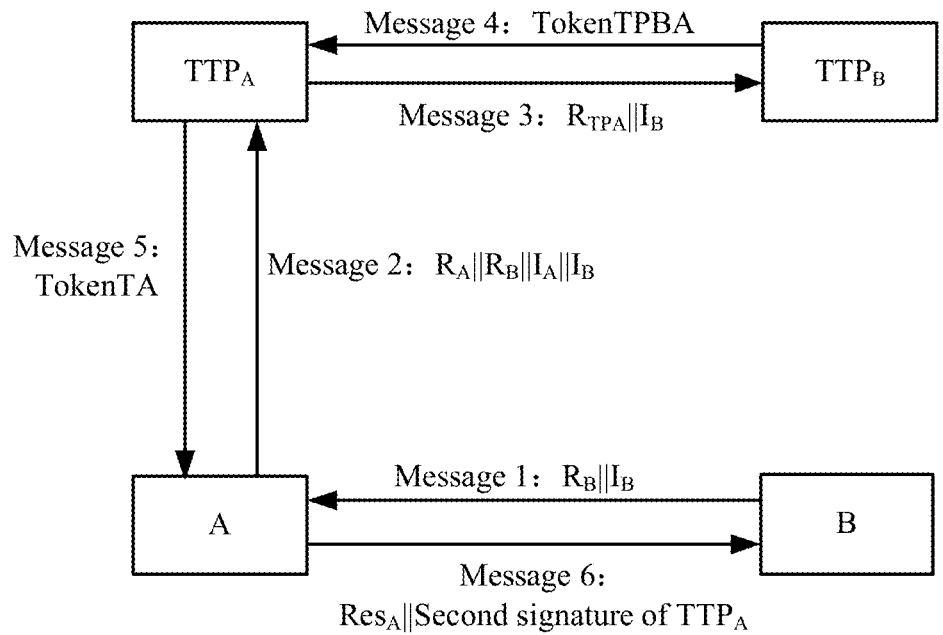
FIG. 1 is a schematic diagram showing an identity validity verification method with multiple TTPs being involved according to a preferred embodiment of the present disclosure.

Referring to FIG. 1, an entity identity validity verification method with multiple TTPs being involved is provided according to the present disclosure. The method involves an entity A, an entity B, a trusted third party $TTP_A$ and a trusted third party $TTP_B$. The $TTP_A$ is capable of verifying validity of an identity of the entity A, and the $TTP_B$ is capable of verifying validity of an identity of the entity B. The entity A trusts the $TTP_A$, and the entity B trusts the $TTP_A$ and the $TTP_B$. The method includes the following steps 1) to 7).

In step 1), the entity B transmits a message 1 to the entity A. The message 1 includes identity information $I_B$ of the entity B and a random number $R_B$ generated by the entity B.

In step 2), after the entity A receives the message 1, the entity A transmits a message 2 to the trusted third party $TTP_A$. The message 2 includes identity information $I_A$ of the entity A, a random number $R_A$ generated by the entity A, the identity information $I_B$ of the entity B, and the random number $R_B$.

In step 3), after the trusted third party $TTP_A$ receives the message 2 transmitted by the entity A, the trusted third party $TTP_A$ verifies the identity of the entity A based on $I_A$, and transmits a message 3 to the trusted third party $TTP_B$. The message 3 includes $I_B$ and a random number $R_{TPA}$ generated by the $TTP_A$.

In step 4), after the $TTP_B$ receives the message 3 transmitted by the $TTP_A$, the $TTP_B$ verifies the identity of the entity B based on $I_B$ and transmits a message 4 to the $TTP_A$. The message 4 includes a token TokenTPBA. TokenTPBA includes $Res_B$, and a first signature of the $TTP_B$. $Res_B$ is a verification result of verifying the entity B by the $TTP_B$. Signature objects of the first signature of the $TTP_B$ include $R_{TPA}$ and $Res_B$.

In step 5), after the $TTP_A$ receives the message 4 transmitted by the $TTP_B$, the $TTP_A$ verifies the first signature of the $TTP_B$ in TokenTPBA; after the first signature of the $TTP_B$ passes the verification performed by the $TTP_A$, the $TTP_A$ checks whether $R_{TPA}$ acquired from the message 4 is the same as the random number $R_{TPA}$ in the message 3 transmitted by the $TTP_A$ to the $TTP_B$; if $R_{TPA}$ acquired from the message 4 is the same as the random number $R_{TPA}$ in the message 3 transmitted by the $TTP_A$ to the $TTP_B$, the $TTP_A$ constructs a message 5 and transmits the message 5 to the entity A. The message 5 includes a token TokenTA. TokenTA includes $Res_A$, $Res_B$, a first signature of the $TTP_A$, and a second signature of the $TTP_A$. $Res_A$ is a verification result of verifying the entity A by the $TTP_A$. Signature objects of the first signature of the $TTP_A$ include $Res_B$ and $R_A$, and signature objects of the second signature of the $TTP_A$ include $Res_A$ and $R_B$.

In step 6), after the entity A receives the message 5 from the $TTP_A$, the entity A verifies the first signature of the $TTP_A$ in TokenTA; after the first signature of the $TTP_A$ passes the verification performed by the entity A, the entity A checks whether $R_A$ acquired from the message 5 is the same as the random number $R_A$ in the message 2 transmitted by the entity A to the $TTP_A$; if $R_A$ acquired from the message 5 is the same as the random number $R_A$ in the message 2 transmitted by the entity A to the $TTP_A$, the entity A determines the validity of the identity of the entity B based on the verification result $Res_B$, and the entity A constructs a message 6 and transmits the message 6 to the entity B. The message 6 includes $Res_A$, and the second signature of the $TTP_A$.

In step 7), after the entity B receives the message 6, the entity B verifies the second signature of the $TTP_A$; after the second signature of the $TTP_A$ passes the verification performed by the entity B, the entity B checks whether $R_B$ acquired from the message 6 is the same as the random number $R_B$ in the message 1 transmitted by the entity B to the entity A; if $R_B$ acquired from the message 6 is the same as the random number $R_B$ in the message 1 transmitted by the entity B to the entity A, the entity B determines the validity of the identity of the entity A based on the verification result $Res_A$.

Thus, mutual identity validity verification between the entity A and the entity B is completed.

Specifically, a process that the trusted third party $TTP_A$ verifies the identity of the entity A based on $I_A$ after the trusted third party $TTP_A$ receives the message 2 transmitted by the entity A in step 3) described above may be performed as follows. In a case that $I_A$ is a distinguisher of the entity A, the $TTP_A$ extracts a public key $P_A$ of the entity A, and $Res_A$ includes $P_A$. In a case that $I_A$ is a certificate $Cert_A$ of the entity A, the $TTP_A$ checks validity of $Cert_A$, and $Res_A$ includes a validity state of $Cert_A$. If the $TTP_A$ is incapable of acquiring the public key or the validity of the certificate of the entity A, $Res_A$ includes content indicating failed verification.

Specifically, a process that the trusted third party $TTP_B$ verifies the identity of the entity B based on $I_B$ after the trusted third party $TTP_B$ receives the message 3 transmitted by the $TTP_A$ in step 4) described above may be performed as follows. In a case that $I_B$ is a distinguisher of the entity B, the $TTP_B$ extracts a public key $P_B$ of the entity B, and $Res_B$ includes $P_B$. In a case that $I_B$ is a certificate $Cert_B$ of the entity B, the $TTP_B$ checks validity of $Cert_B$, and $Res_B$ includes a validity state of $Cert_B$. If the $TTP_B$ is incapable of acquiring the public key or the validity of the certificate of the entity B, $Res_B$ includes content indicating failed verification.

Specifically, in step 3), the $TTP_A$ may not generate the random number $R_{TPA}$, and $R_{TPA}$ in the message 3 may be directly replaced with the random number $R_A$ which is generated by the entity A and transmitted to the $TTP_A$. In the subsequent step 4) and step 5), $R_{TPA}$ may also be replaced with $R_A$.

In this way, the $TTP_A$ is not required to generate any random number while security is hardly affected, thereby reducing calculation complexity of the $TTP_A$, and improving efficiency of the system.

Specifically, in step 5), step 6), and step 7), if the signature does not pass the verification with respect to the signature or it is determined that the random numbers are different from each other, a well-known process in the art, such as discarding a corresponding message or terminating the identity validity verification process, may be performed.

As well-known technologies in the art, digital signature algorithms include a signature algorithm with message recovery, a signature algorithm without message recovery, and the like. In a case that a signature verifier is capable of recovering a target field when the signature verifier verifies a signature, the signature verifier may recover the target field directly from the signature after the signature passes verification performed by the signature verifier. In a case that the signature verifier is incapable of recovering the target field when the signature verifier verifies the signature, those skilled in the art usually may set that the target field is carried in a message, and the signature verifier may acquire the target field directly from the message. Taking step 5) described above as an example, in a case that the $TTP_A$ is capable of recovering a target field $R_{TPA}$ when the $TTP_A$ verifies the first signature of the $TTP_B$, the $TTP_A$ may recover $R_{TPA}$ directly from the signature after the signature of the $TTP_B$ passes verification performed by the $TTP_A$. In addition, in a case that the $TTP_A$ is incapable of recovering the target field $R_{TPA}$ when the $TTP_A$ verifies the signature, $R_{TPA}$ is directly carried in the message 4, and the $TTP_A$ may acquire $R_{TPA}$ directly from the message 4.

Figure 2:
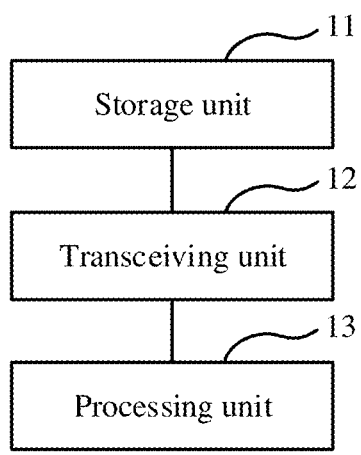
FIG. 2 is a schematic diagram of a first entity identity validity verification device according to the present disclosure.

Referring to FIG. 2, based on the entity identity validity verification method described above, there is further provided a first entity identity validity verification device for performing identity validity verification together with a second entity identity validity verification device with a first trusted third party device and a second trusted third party device being involved according to the present disclosure. The first entity identity validity verification device includes a storage unit 11, a transceiving unit 12 and a processing unit 13.

The processing unit 13 is configured to generate a random number $R_A$.

The storage unit 11 is configured to store identity information $I_A$ of the first entity identity validity verification device.

The transceiving unit 12 is configured to receive a message 1 transmitted by the second entity identity validity verification device and transmit a message 2 to the first trusted third party device. The message 1 includes identity information $I_B$ of the second entity identity validity verification device, and a random number $R_B$ generated by the second entity identity validity verification device. The message 2 includes $I_A$, $R_A$, $I_B$ and $R_B$.

The transceiving unit 12 is further configured to receive a message 5 transmitted by the first trusted third party device and transmit a message 6 to the second entity identity validity verification device. The message 5 includes a token TokenTA. TokenTA includes $Res_A$, $Res_B$, a first signature of the first trusted third party device, and a second signature of the first trusted third party device. $Res_A$ is a verification result of verifying the first entity identity validity verification device by the first trusted third party device, and $Res_B$ is a verification result of verifying the second entity identity validity verification device by the second trusted third party device. Signature objects of the first signature of the first trusted third party device include $Res_B$ and $R_A$, and signature objects of the second signature of the first trusted third party device include $Res_A$ and $R_B$. The message 6 includes $Res_A$ and the second signature of the first trusted third party device.

The processing unit 13 is further configured to: verify the first signature of the first trusted third party device in TokenTA; check whether $R_A$ acquired from the message 5 is the same as the random number $R_A$ in the message 2 transmitted by the first entity identity validity verification device to the first trusted third party device; determine validity of an identity of the second entity identity validity verification device based on the verification result $Res_B$; and construct the message 6.

Figure 3:
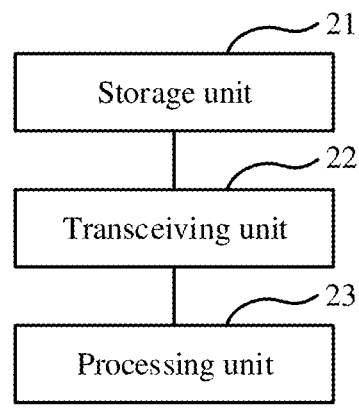
FIG. 3 is a schematic diagram of a second entity identity validity verification device according to the present disclosure.

Referring to FIG. 3, based on the entity identity validity verification method described above, there is further provided a second entity identity validity verification device for performing identity validity verification together with a first entity identity validity verification device with a first trusted third party device and a second trusted third party device being involved according to the present disclosure. The second entity identity validity verification device includes a storage unit 21, a transceiving unit 22 and a processing unit 23.

The processing unit 23 is configured to generate a random number $R_B$.

The storage unit 21 is configured to store identity information $I_B$ of the second entity identity validity verification device.

The transceiving unit 22 is configured to transmit a message 1 and receive a message 6 transmitted by the first entity identity validity verification device. The message 1 includes $I_B$ and $R_B$. The message 6 includes $Res_A$, and a second signature of the first trusted third party device. $Res_A$ is a verification result of verifying the first entity identity validity verification device by the first trusted third party device. Signature objects of the second signature of the first trusted third party device include $Res_A$ and $R_B$.

The processing unit 23 is further configured to: verify the second signature of the first trusted third party device; check whether $R_B$ acquired from the message 6 is the same as the random number $R_B$ in the message 1 transmitted by the second entity identity validity verification device to the first entity identity validity verification device; and determine validity of an identity of the first entity identity validity verification device based on the verification result $Res_A$.

Figure 4:
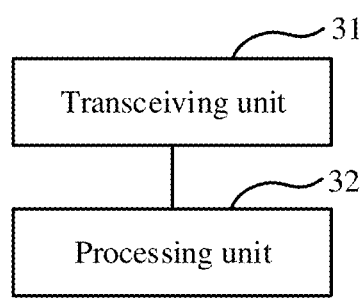
FIG. 4 is a schematic diagram of a first trusted third party device according to the present disclosure.

Referring to FIG. 4, based on the entity identity validity verification method described above, there is further provided a first trusted third party device for being involved in identity validity verification between a first entity identity validity verification device and a second entity identity validity verification device together with a second trusted third party device according to the present disclosure. The first trusted third party device includes a transceiving unit 31 and a processing unit 32.

The transceiving unit 31 is configured to receive a message 2 transmitted by the first entity identity validity verification device. The message 2 includes identity information $I_A$ of the first entity identity validity verification device, a random number $R_A$ generated by the first entity identity validity verification device, identity information $I_B$ of the second entity identity validity verification device, and a random number $R_B$ generated by the second entity identity validity verification device.

The processing unit 32 is configured to verify an identity of the first entity identity validity verification device based on $I_A$.

The transceiving unit 31 is further configured to transmit a message 3 to the second trusted third party device. The message 3 includes $I_B$ and a random number $R_{TPA}$ generated by the first trusted third party device.

The transceiving unit 31 is further configured to receive a message 4 transmitted by the second trusted third party device. The message 4 includes a token TokenTPBA. TokenTPBA includes $Res_B$, and a first signature of the second trusted third party device. $Res_B$ is a verification result of verifying the second entity identity validity verification device by the second trusted third party device. Signature objects of the first signature of the second trusted third party device include $R_{TPA}$ and $Res_B$.

The processing unit 32 is further configured to: verify the first signature of the second trusted third party device in TokenTPBA; check whether $R_{TPA}$ acquired from the message 4 is the same as the random number $R_{TPA}$ in the message 3 transmitted by the first trusted third party device to the second trusted third party device; and construct a message 5. The message 5 includes a token TokenTA. TokenTA includes $Res_A$, $Res_B$, a first signature of the first trusted third party device, and a second signature of the first trusted third party device. $Res_A$ is a verification result of verifying the first entity identity validity verification device by the first trusted third party device. Signature objects of the first signature of the first trusted third party device include $Res_B$ and $R_A$, and signature objects of the second signature of the second trusted third party device include $Res_A$ and $R_B$.

The transceiving unit 31 is further configured to transmit the message 5 to the first entity identity validity verification device.

Specifically, in a process that the first trusted third party device $TTP_A$ verifies the identity of the first entity identity validity verification device based on $I_A$ after the first trusted third party device $TTP_A$ receives the message 2 transmitted by the first entity identity validity verification device, the processing unit 32 may be further configured to:

extract a public key $P_A$ of the first entity identity validity verification device in a case that $I_A$ is a distinguisher of the first entity identity validity verification device; and check validity of a certificate $Cert_A$ of the first entity identity validity verification device in a case that $I_A$ is the certificate $Cert_A$ of the first entity identity validity verification device.

Figure 5:
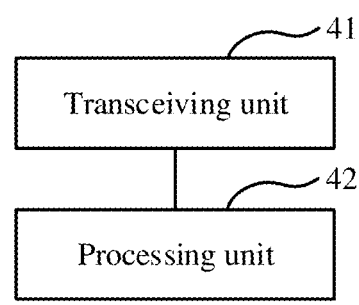
FIG. 5 is a schematic diagram of a second trusted third party device according to the present disclosure.

Referring to FIG. 5, based on the entity identity validity verification method described above, there is further provided a second trusted third party device for being involved in identity validity verification between a first entity identity validity verification device and a second entity identity validity verification device together with a first trusted third party device according to the present disclosure. The second trusted third party device includes a transceiving unit 41 and a processing unit 42.

The transceiving unit 41 is configured to receive a message 3 transmitted by the first trusted third party device. The message 3 includes identity information $I_B$ of the second entity identity validity verification device, and a random number $R_{TPA}$ generated by the first trusted third party device.

The processing unit 42 is configured to verify an identity of the second entity identity validity verification device based on $I_B$.

The transceiving unit 41 is further configured to transmit a message 4 to the first trusted third party device. The message 4 includes a token TokenTPBA. TokenTPBA includes $Res_B$, and a first signature of the second trusted third party device. $Res_B$ is a verification result of verifying the second entity identity validity verification device by the second trusted third party device. Signature objects of the first signature of the second trusted third party device include $R_{TPA}$ and $Res_B$.

Specifically, in a process that the second trusted third party device verifies the identity of the second entity identity validity verification device based on $I_B$ after the second trusted third party device receives the message 3 transmitted by the first trusted third party device, the processing unit 42 may be further configured to:

extract a public key $P_B$ of the second entity identity validity verification device in a case that $I_B$ is a distinguisher of the second entity identity validity verification device; and check validity of a certificate $Cert_B$ of the second entity identity validity verification device in a case that $I_B$ is the certificate $Cert_B$ of the second entity identity validity verification device.

It should be noted that the devices according to the present disclosure correspond to the entities in the method embodiment according to the present disclosure, respectively. Specifically, the first entity identity validity verification device includes the entity A, the second entity identity validity verification device includes the entity B, the first trusted third party device includes the trusted third party $TTP_A$, and the second trusted third party device includes the trusted third party $TTP_B$. Therefore, a system formed by the devices according to the present disclosure with reference to FIG. 1 can implement the method according to the present disclosure. It should be understood by those skilled in the art that the specific configuration of each device has been shown in the device embodiment, and operation details thereof also correspond to the method embodiment, which are not described in detail herein.

It should be understood by those skilled in the art that the embodiments of the present disclosure may be implemented as a method, a system or a computer program product. Therefore, the present disclosure may be implemented by only hardware embodiments, only software embodiments or embodiments combining software with hardware. Alternatively, the present disclosure may be implemented as computer program products implemented on one or more computer available storage mediums (including but not limited to a magnetic disk memory, CD-ROM and an optical memory or the like) including computer available program codes.

The present disclosure is described with reference to flowcharts and/or block diagrams of the methods, devices (systems) and computer program products according to the present disclosure. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, an embedded processor or processors of other programmable data processing devices to generate a machine, such that the instructions executed by the computer or the processors of the other programmable data processing devices generate a device for implementing functions specified in one or more flows of the flowcharts and/or one or more blocks of the block diagrams.

The computer program instructions may also be stored in a computer readable memory which can guide the computer or other programmable data processing devices to operate in a certain manner, such that the instructions stored in the computer readable memory generate a product including an instruction device which implements functions specified in one or more flows of the flowcharts and/or one or more blocks of the block diagrams.

The computer program instructions may also be loaded to the computer or other programmable data processing devices, such that the computer or other programmable devices perform a series of operation steps to generate processing implemented by the computer, and thus the instructions executed on the computer or other programmable devices provide steps for implementing the functions specified in one or more flows of the flowcharts and/or one or more blocks of the block diagrams.

Although the preferred embodiments of the present disclosure are described, those skilled in the art may make additional changes and modifications to the embodiments once they know the basic creative concepts. Therefore, the appended claims are intended to be explained as including the preferred embodiments and all changes and modifications falling within the scope of the present disclosure.

Apparently, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. An entity identity validity verification method with a plurality of trusted third parties (TTPs) being involved, wherein the method involves an entity A, an entity B, a trusted third party $TTP_A$ and a trusted third party $TTP_B$, the $TTP_A$ is capable of verifying validity of an identity of the entity A, the $TTP_B$ is capable of verifying validity of an identity of the entity B, the entity A trusts the $TTP_A$, and the entity B trusts the $TTP_A$ and the $TTP_B$, and wherein the method comprises:

step 1) transmitting, by the entity B, a message 1 to the entity A, wherein the message 1 comprises identity information $I_B$ of the entity B and a random number $R_B$ generated by the entity B;

step 2) transmitting, by the entity A, a message 2 to the trusted third party $TTP_A$ after the entity A receives the message 1, wherein the message 2 comprises identity information $I_A$ of the entity A, a random number $R_A$ generated by the entity A, the identity information $I_B$ of the entity B, and the random number $R_B$;

step 3) after the trusted third party $TTP_A$ receives the message 2 transmitted by the entity A, verifying, by the trusted third party $TTP_A$, the identity of the entity A based on $I_A$, and transmitting, by the trusted third party $TTP_A$, a message 3 to the trusted third party $TTP_B$, wherein the message 3 comprises $I_B$ and a random number $R_{TPA}$ generated by the $TTP_A$;

step 4) after the $TTP_B$ receives the message 3 transmitted by the $TTP_A$, verifying, by the $TTP_B$, the identity of the entity B based on $I_B$, and transmitting, by the $TTP_B$, a message 4 to the $TTP_A$, wherein the message 4 comprises a token TokenTPBA, wherein TokenTPBA comprises $Res_B$, and a first signature of the $TTP_B$, wherein $Res_B$ is a verification result of verifying the entity B by the $TTP_B$, and signature objects of the first signature of the $TTP_B$ comprise $R_{TPA}$ and $Res_B$;

step 5) after the $TTP_A$ receives the message 4 transmitted by the $TTP_B$, verifying, by the $TTP_A$, the first signature of the $TTP_B$ in TokenTPBA; after the first signature of the $TTP_B$ passes the verification performed by the $TTP_A$, checking, by the $TTP_A$, whether $R_{TPA}$ acquired from the message 4 is the same as the random number $R_{TPA}$ in the message 3 transmitted by the $TTP_A$ to the $TTP_B$; if $R_{TPA}$ acquired from the message 4 is the same as the random number $R_{TPA}$ in the message 3 transmitted by the $TTP_A$ to the $TTP_B$, constructing a message 5 and transmitting the message 5 to the entity A by the $TTP_A$, wherein the message 5 comprises a token TokenTA, wherein TokenTA comprises $Res_A$, $Res_B$, a first signature of the $TTP_A$, and a second signature of the $TTP_A$, wherein $Res_A$ is a verification result of verifying the entity A by the $TTP_A$, signature objects of the first signature of the $TTP_A$ comprise $Res_B$ and $R_A$, and signature objects of the second signature of the $TTP_A$ comprise $Res_A$ and $R_B$;

step 6) after the entity A receives the message 5 from the $TTP_A$, verifying, by the entity A, the first signature of the $TTP_A$ in TokenTA; after the first signature of the $TTP_A$ passes the verification performed by the entity A, checking, by the entity A, whether $R_A$ acquired from the message 5 is the same as the random number $R_A$ in the message 2 transmitted by the entity A to the $TTP_A$; if $R_A$ acquired from the message 5 is the same as the random number $R_A$ in the message 2 transmitted by the entity A to the $TTP_A$, determining, by the entity A, the validity of the identity of the entity B based on the verification result $Res_B$, and constructing a message 6 and transmitting the message 6 to the entity B by the entity A, wherein the message 6 comprises $Res_A$, and the second signature of the $TTP_A$; and step 7) after the entity B receives the message 6, verifying, by the entity B, the second signature of the $TTP_A$; after the second signature of the $TTP_A$ passes the verification performed by the entity B, checking, by the entity B, whether $R_B$ acquired from the message 6 is the same as the random number $R_B$ in the message 1 transmitted by the entity B to the entity A; if $R_B$ acquired from the message 6 is the same as the random number $R_B$ in the message 1 transmitted by the entity B to the entity A, determining, by the entity B, the validity of the identity of the entity A based on the verification result $Res_A$.

2. The entity identity validity verification method according to claim 1, wherein the trusted third party $TTP_A$ verifying the identity of the entity A based on $I_A$ after the trusted third party $TTP_A$ receives the message 2 transmitted by the entity A in step 3) comprises:

in a case that $I_A$ is a distinguisher of the entity A, extracting, by the $TTP_A$, a public key $P_A$ of the entity A, wherein $Res_A$ comprises $P_A$; and in a case that $I_A$ is a certificate $Cert_A$ of the entity A, checking, by the $TTP_A$, validity of $Cert_A$, wherein $Res_A$ comprises a validity state of $Cert_A$; wherein if the $TTP_A$ is incapable of acquiring the public key or the validity of the certificate of the entity A, $Res_A$ comprises content indicating failed verification.

3. The entity identity validity verification method according to claim 2, wherein $R_{TPA}$ in steps 3), 4) and 5) is replaced with $R_A$.

4. The entity identity validity verification method according to claim 1, wherein the trusted third party $TTP_B$ verifying the identity of the entity B based on $I_B$ after the trusted third party $TTP_B$ receives the message 3 transmitted by the $TTP_A$ in step 4) comprises:

in a case that $I_B$ is a distinguisher of the entity B, extracting, by the $TTP_B$, a public key $P_B$ of the entity B, wherein $Res_B$ comprises $P_B$; and in a case that $I_B$ is a certificate $Cert_B$ of the entity B, checking, by the $TTP_B$, validity of $Cert_B$, wherein $Res_B$ comprises a validity state of $Cert_B$; wherein if the $TTP_B$ is incapable of acquiring the public key or the validity of the certificate of the entity B, $Res_B$ comprises content indicating failed verification.

5. The entity identity validity verification method according to claim 4, wherein $R_{TPA}$ in steps 3), 4) and 5) is replaced with $R_A$.

6. The entity identity validity verification method according to claim 1, wherein the $TTP_A$ acquiring $R_{TPA}$ from the message 4 in step 5) comprises:

recovering, by the $TTP_A$, $R_{TPA}$ directly from the first signature of the $TTP_B$ after the first signature of the $TTP_B$ passes verification performed by the $TTP_A$, in a case that the $TTP_A$ is capable of recovering $R_{TPA}$ from the first signature of the $TTP_B$ when the $TTP_A$ verifies the first signature of the $TTP_B$; and acquiring, by the $TTP_A$, $R_{TPA}$ directly from the message 4 comprising an $R_{TPA}$ field, in a case that the $TTP_A$ is incapable of recovering $R_{TPA}$ from the first signature of the $TTP_B$ when the $TTP_A$ verifies the first signature of the $TTP_B$;

the entity A acquiring $R_A$ from the message 5 in step 6) comprises:

recovering, by the entity A, $R_A$ directly from the first signature of the $TTP_A$ after the first signature of the $TTP_A$ passes verification performed by the entity A, in a case that the entity A is capable of recovering $R_A$ from the first signature of the $TTP_A$ when the entity A verifies the first signature of the $TTP_A$; and acquiring, by the entity A, $R_A$ directly from the message 5 comprising an $R_A$ field, in a case that the entity A is incapable of recovering $R_A$ from the first signature of the $TTP_A$ when the entity A verifies the first signature of the $TTP_A$; and the entity B acquiring $R_B$ from the message 6 in step 7) comprises:

recovering, by the entity B, $R_B$ directly from the second signature of the $TTP_A$ after the second signature of the $TTP_A$ passes verification performed by the entity B, in a case that the entity B is capable of recovering $R_B$ from the second signature of the $TTP_A$ when the entity B verifies the second signature of the $TTP_A$; and acquiring, by the entity B, $R_B$ directly from the message 6 comprising an $R_B$ field, in a case that the entity B is incapable of recovering $R_B$ from the second signature of the $TTP_A$ when the entity B verifies the second signature of the $TTP_A$.

7. The entity identity validity verification method according to claim 6, wherein $R_{TPA}$ in steps 3), 4) and 5) is replaced with $R_A$.

8. The entity identity validity verification method according to claim 1, wherein $R_{TPA}$ in steps 3), 4) and 5) is replaced with $R_A$.

9. A first entity identity validity verification device for performing identity validity verification together with a second entity identity validity verification device with a first trusted third party device and a second trusted third party device being involved, the first entity identity validity verification device comprising:

a processing unit configured to generate a random number $R_A$;

a storage unit configured to store identity information $I_A$ of the first entity identity validity verification device; and a transceiving unit configured to:

receive a message 1 transmitted by the second entity identity validity verification device and transmit a message 2 to the first trusted third party device, wherein the message 1 comprises identity information $I_B$ of the second entity identity validity verification device and a random number $R_B$ generated by the second entity identity validity verification device, and the message 2 comprises $I_A$, $R_A$, $I_B$ and $R_B$;

receive a message 5 transmitted by the first trusted third party device and transmit a message 6 to the second entity identity validity verification device, wherein the message 5 comprises a token TokenTA, wherein TokenTA comprises $Res_A$, $Res_B$, a first signature of the first trusted third party device, and a second signature of the first trusted third party device, wherein $Res_A$ is a verification result of verifying the first entity identity validity verification device by the first trusted third party device, $Res_B$ is a verification result of verifying the second entity identity validity verification device by the second trusted third party device, signature objects of the first signature of the first trusted third party device comprise $Res_B$ and $R_A$, signature objects of the second signature of the first trusted third party device comprise $Res_A$ and $R_B$, and the message 6 comprises $Res_A$ and the second signature of the first trusted third party device, wherein the processing unit is further configured to: verify the first signature of the first trusted third party device in TokenTA; check whether $R_A$ acquired from the message 5 is the same as the random number $R_A$ in the message 2 transmitted by the first entity identity validity verification device to the first trusted third party device; determine validity of an identity of the second entity identity validity verification device based on the verification result $Res_B$; and construct the message 6, wherein the message 6 transmitted by the transceiving unit is constructed as follows, the message 1 transmitted by the second entity identity validity verification device to the transceiving unit is used by the first entity identity validity verification device to construct the message 2;

the message 2 is transmitted by the transceiving unit to the first trusted third party device, and the first trusted third party device verifies the identity of the first entity identity validity verification device based on $I_A$, and the first trusted third party device constructs a message 3 based on the message 2, wherein the message 3 comprises $I_B$ and a random number $R_{TPA}$ generated by the first trusted third party device;

the message 3 is transmitted by the first trusted third party device to the second trusted third party device, and the second trusted third party device verifies the identity of the second entity identity validity verification device based on $I_B$, and the second trusted third party device constructs a message 4 based on the message 3, wherein the message 4 comprises a token TokenTPBA, wherein TokenTPBA comprises $Res_B$, and a first signature of the second trusted third party device, wherein $Res_B$ is a verification result of verifying the second entity identity validity verification device by the second trusted third party device, and signature objects of the first signature of the second trusted third party device comprise $R_{TPA}$ and $Res_B$;

the message 4 is transmitted by the second trusted third party device to the first trusted third party device, and the first trusted third party device verifies the first signature of the second trusted third party device in TokenTPBA; after the first signature of the second trusted third party device passes the verification performed by the first trusted third party device, the first trusted third party device checks whether $R_{TPA}$ acquired from the message 4 is the same as the random number $R_{TPA}$ in the message 3 transmitted by the first trusted third party device to the second trusted third party device; if $R_{TPA}$ acquired from the message 4 is the same as the random number $R_{TPA}$ in the message 3 transmitted by the first trusted third party device to the second trusted third party device, the first trusted third party device constructs a message 5 based on the message 4, the message 5 is transmitted by the first trusted third party device to the transceiving unit, and the processing unit constructs the message 6 based on the message 5.

10. The first entity identity validity verification device according to claim 9, wherein the messages 1 to 6 occur in the following order: the message 1, the message 2, the message 3, the message 4, the message 5, and the message 6.

11. A second entity identity validity verification device for performing identity validity verification together with a first entity identity validity verification device with a first trusted third party device and a second trusted third party device being involved, the second entity identity validity verification device comprising:

a processing unit configured to generate a random number $R_B$;

a storage unit configured to store identity information $I_B$ of the second entity identity validity verification device; and a transceiving unit configured to transmit a message 1 and receive a message 6 transmitted by the first entity identity validity verification device, wherein the message 1 comprises $I_B$ and $R_B$, the message 6 comprises $Res_A$, and a second signature of the first trusted third party device, wherein $Res_A$ is a verification result of verifying the first entity identity validity verification device by the first trusted third party device, and signature objects of the second signature of the first trusted third party device comprise $Res_A$ and $R_B$, wherein the message 6 received by the transceiving unit is constructed as follows, the message 1 transmitted by the transceiving unit to the first entity identity validity verification device is used by the first entity identity validity verification device to construct a message 2, wherein the message 2 comprises identity information $I_A$ of the first entity identity validity verification device, a random number $R_A$ generated by the first entity identity validity verification device, $I_B$ and $R_B$;

the message 2 is transmitted by the first entity identity validity verification device to the first trusted third party device, and the first trusted third party device verifies an identity of the first entity identity validity verification device based on $I_A$ and constructs a message 3 based on the message 2, wherein the message 3 comprises $I_B$ and a random number $R_{TPA}$ generated by the first trusted third party device;

the message 3 is transmitted by the first trusted third party device to the second trusted third party device, and the second trusted third party device verifies the identity of the second entity identity validity verification device based on $I_B$ and constructs a message 4 based on the message 3, wherein the message 4 comprises a token TokenTPBA, wherein TokenTPBA comprises $Res_B$, and a first signature of the second trusted third party device, wherein $Res_B$ is a verification result of verifying the second entity identity validity verification device by the second trusted third party device, and signature objects of the first signature of the second trusted third party device comprise $R_{TPA}$ and $Res_B$;

the message 4 is transmitted by the second trusted third party device to the first trusted third party device, and the first trusted third party device verifies the first signature of the second trusted third party device in TokenTPBA; after the first signature of the second trusted third party device passes the verification performed by the first trusted third party device, the first trusted third party device checks whether $R_{TPA}$ acquired from the message 4 is the same as the random number $R_{TPA}$ in the message 3 transmitted by the first trusted third party device to the second trusted third party device; if $R_{TPA}$ acquired from the message 4 is the same as the random number $R_{TPA}$ in the message 3, the first trusted third party device constructs a message 5 based on the message 4, wherein the message 5 comprises a token TokenTA, wherein TokenTA comprises $Res_A$, $Res_B$, a first signature of the first trusted third party device, and a second signature of the first trusted third party device, wherein $Res_A$ is a verification result of verifying the first entity identity validity verification device by the first trusted third party device, signature objects of the first signature of the first trusted third party device comprise $Res_B$ and $R_A$, and signature objects of the second signature of the first trusted third party device comprise $Res_A$ and $R_B$;

the message 5 is transmitted by the first trusted third party device to the first entity identity validity verification device, and the first entity identity validity verification device verifies the first signature of the first trusted third party device in TokenTA; after the first signature of the first trusted third party device passes the verification performed by the first entity identity validity verification device, the first entity identity validity verification device checks whether $R_A$ acquired from the message 5 is the same as the random number $R_A$ in the message 2 transmitted by the first entity identity validity verification device to the first trusted third party device; if $R_A$ acquired from the message 5 is the same as the random number $R_A$ in the message 2, the first entity identity validity verification device determines the validity of the identity of the second entity identity validity verification device based on the verification result $Res_B$ and constructs the message 6 based on the message 5, wherein the processing unit is further configured to: verify the second signature of the first trusted third party device; check whether $R_B$ acquired from the message 6 is the same as the random number $R_B$ in the message 1 transmitted by the second entity identity validity verification device to the first entity identity validity verification device; and determine validity of an identity of the first entity identity validity verification device based on the verification result $Res_A$.

12. The second entity identity validity verification device according to claim 11, wherein the messages 1 to 6 occur in the following order: the message 1, the message 2, the message 3, the message 4, the message 5, and the message 6.

13. A first trusted third party device for being involved in identity validity verification between a first entity identity validity verification device and a second entity identity validity verification device together with a second trusted third party device, the first trusted third party device comprising:

a transceiving unit configured to receive a message 2 transmitted by the first entity identity validity verification device, wherein the message 2 comprises identity information $I_A$ of the first entity identity validity verification device, a random number $R_A$ generated by the first entity identity validity verification device, identity information $I_B$ of the second entity identity validity verification device, and a random number $R_B$ generated by the second entity identity validity verification device; and a processing unit configured to verify an identity of the first entity identity validity verification device based on $I_A$, wherein the transceiving unit is further configured to transmit a message 3 to the second trusted third party device, wherein the message 3 comprises $I_B$ and a random number $R_{TPA}$ generated by the first trusted third party device;

the transceiving unit is further configured to receive a message 4 transmitted by the second trusted third party device, wherein the message 4 comprises a token TokenTPBA, wherein TokenTPBA comprises $Res_B$, and a first signature of the second trusted third party device, wherein $Res_B$ is a verification result of verifying the second entity identity validity verification device by the second trusted third party device, and signature objects of the first signature of the second trusted third party device comprise $R_{TPA}$ and $Res_B$;

the processing unit is further configured to: verify the first signature of the second trusted third party device in TokenTPBA; check whether $R_{TPA}$ acquired from the message 4 is the same as the random number $R_{TPA}$ in the message 3 transmitted by the first trusted third party device to the second trusted third party device; and construct a message 5, wherein the message 5 comprises a token TokenTA, wherein TokenTA comprises $Res_A$, $Res_B$, a first signature of the first trusted third party device, and a second signature of the first trusted third party device, wherein $Res_A$ is a verification result of verifying the first entity identity validity verification device by the first trusted third party device, signature objects of the first signature of the first trusted third party device comprise $Res_B$ and $R_A$, and signature objects of the second signature of the first trusted third party device comprise $Res_A$ and $R_B$; and the transceiving unit is further configured to transmit the message 5 to the first entity identity validity verification device, wherein the message 5 transmitted by the transceiving unit is constructed as follows, a message 1 is transmitted by the second entity identity validity verification device to the first entity identity validity verification device, wherein the message 1 comprises identity information $I_B$ of the second entity identity validity verification device and a random number $R_B$ generated by the second entity identity validity verification device, and the first entity identity validity verification device constructs the message 2 based on the message 1;

the message 2 is transmitted by the first entity identity validity verification device to the transceiving unit, and the first trusted third party device constructs the message 3 based on the message 2;

the message 3 is transmitted by the transceiving unit to the second trusted third party device, and the second trusted third party device verifies the identity of the second entity identity validity verification device based on $I_B$ and the second trusted third party device constructs the message 4 based on the message 3;

the message 4 is transmitted by the second trusted third party device to the transceiving unit, and the first trusted third party device constructs the message 5 based on the message 4, wherein the message 5 is transmitted by the transceiving unit to the first entity identity validity verification device, the first entity identity validity verification device verifies the first signature of the first trusted third party device in TokenTA; after the first signature of the first trusted third party device passes the verification performed by the first entity identity validity verification device, the first entity identity validity verification device checks whether $R_A$ acquired from the message 5 is the same as the random number $R_A$ in the message 2 transmitted by the first entity identity validity verification device to the first trusted third party device; if $R_A$ acquired from the message 5 is the same as the random number $R_A$ in the message 2 transmitted by the first entity identity validity verification device to the first trusted third party device, the first entity identity validity verification device determines the validity of the identity of the second entity identity validity verification device based on the verification result $Res_A$, and the first entity identity validity verification device constructs a message 6 based on the message 5, wherein the message 6 comprises $Res_A$, and the second signature of the first trusted third party device; and the message 6 is transmitted by the first entity identity validity verification device to the second entity identity validity verification device, the second entity identity validity verification device verifies the second signature of the first trusted third party device; after the second signature of the first trusted third party device passes the verification performed by the second entity identity validity verification device, the second entity identity validity verification device checks whether $R_B$ acquired from the message 6 is the same as the random number $R_B$ in the message 1 transmitted by the second entity identity validity verification device to the first entity identity validity verification device; if $R_B$ acquired from the message 6 is the same as the random number $R_B$ in the message 1 transmitted by the second entity identity validity verification device to the first entity identity validity verification device, the second entity identity validity verification device determines the validity of the identity of the first entity identity validity verification device based on the verification result $Res_A$.

14. The first trusted third party device according to claim 13, wherein in a process that the first trusted third party device verifies the identity of the first entity identity validity verification device based on $I_A$ after the first trusted third party device receives the message 2 transmitted by the first entity identity validity verification device, the processing unit is further configured to:
    extract a public key $P_A$ of the first entity identity validity verification device in a case that $I_A$ is a distinguisher of the first entity identity validity verification device; and
    check validity of a certificate $Cert_A$ of the first entity identity validity verification device in a case that $I_A$ is the certificate $Cert_A$ of the first entity identity validity verification device.

15. The first trusted third party device according to claim 14, wherein $R_{TPA}$ is replaced with $R_A$.

16. The first trusted third party device according to claim 13, wherein $R_{TPA}$ is replaced with $R_A$.

17. A second trusted third party device for being involved in identity validity verification between a first entity identity validity verification device and a second entity identity validity verification device together with a first trusted third party device, the second trusted third party device comprising:
    a transceiving unit configured to receive a message 3 transmitted by the first trusted third party device, wherein the message 3 comprises identity information $I_B$ of the second entity identity validity verification device, and a random number $R_{TPA}$ generated by the first trusted third party device; and
    a processing unit configured to verify an identity of the second entity identity validity verification device based on $I_B$; wherein
    the transceiving unit is further configured to transmit a message 4 to the first trusted third party device, wherein the message 4 comprises a token TokenTPBA, wherein TokenTPBA comprises $Res_B$ and a first signature of the second trusted third party device, wherein $Res_B$ is a verification result of verifying the second entity identity validity verification device by the second trusted third party device, and signature objects of the first signature of the second trusted third party device comprise $R_{TPA}$ and $Res_B$,
    wherein the message 4 transmitted by the transceiving unit (41) is constructed as follows,
        a message 1 is transmitted by the second entity identity validity verification device to the first entity identity validity verification device, wherein the message 1 comprises identity information $I_B$ of the second entity identity validity verification device and a random number $R_B$ generated by the second entity identity validity verification device; and the first entity identity validity verification device constructs a message 2 based on the message 1, the message 2 comprises identity information $I_A$ of the first entity identity validity verification device, a random number $R_A$ generated by the first entity identity validity verification device, the identity information $I_B$ of the second entity identity validity verification device, and the random number $R_B$;
        the message 2 is transmitted by the first entity identity validity verification device to the first trusted third party device, and the first trusted third party device verifies the identity of the first entity identity validity verification device based on $I_A$, and the first trusted third party device constructs the message 3 based on the message 2;
        the message 3 is transmitted by the first trusted third party device to the transceiving unit, and the second trusted third party device constructs the message 4 based on the message 3;
    wherein
    the message 4 is transmitted by the transceiving unit to the first trusted third party device, and the first trusted third party device verifies the first signature of the second trusted third party device in TokenTPBA; after the first signature of the second trusted third party device passes the verification performed by the first trusted third party device, the first trusted third party device checks whether $R_{TPA}$ acquired from the message 4 is the same as the random number $R_{TPA}$ in the message 3 transmitted by the first trusted third party device to the second trusted third party device; if $R_{TPA}$ acquired from the message 4 is the same as the random number $R_{TPA}$ in the message 3 transmitted by the first trusted third party device to the second trusted third party device, the first trusted third party device constructs a message 5 based on the message 4, wherein the message 5 comprises a token TokenTA, wherein TokenTA comprises $Res_A$, $Res_B$, a first signature of the first trusted third party device, and a second signature of the first trusted third party device, wherein $Res_A$ is a verification result of verifying the first entity identity validity verification device by the first trusted third party device, signature objects of the first signature of the first trusted third party device comprise $Res_B$ and $R_A$, and signature objects of the second signature of the first trusted third party device comprise $Res_A$ and $R_B$;
    the message 5 is transmitted by the first trusted third party device to the first entity identity validity verification device, and the first entity identity validity verification device verifies the first signature of the first trusted third party device in TokenTA; after the first signature of the first trusted third party device passes the verification performed by the first entity identity validity verification device, the first entity identity validity verification device checks whether $R_A$ acquired from the message 5 is the same as the random number $R_A$ in the message 2 transmitted by the first entity identity validity verification device to the first trusted third party device; if $R_A$ acquired from the message 5 is the same as the random number $R_A$ in the message 2 transmitted by the first entity identity validity verification device to the first trusted third party device, the first entity identity validity verification device determines the validity of the identity of the second entity identity validity verification device based on the verification result $Res_B$, and the first entity identity validity verification device constructs a message 6 based on the message 5, wherein the message 6 comprises $Res_A$, and the second signature of the first trusted third party device; and the message 6 is transmitted by the first entity identity validity verification device to the second entity identity validity verification device, and the second entity identity validity verification device verifies the second signature of the first trusted third party device; after the second signature of the first trusted third party device passes the verification performed by the second entity identity validity verification device, the second entity identity validity verification device checks whether $R_B$ acquired from the message 6 is the same as the random number $R_B$ in the message 1 transmitted by the second entity identity validity verification device to the first entity identity validity verification device; if $R_B$ acquired from the message 6 is the same as the random number $R_B$ in the message 1 transmitted by the second entity identity validity verification device to the first entity identity validity verification device, the second entity identity validity verification device determines the validity of the identity of the first entity identity validity verification device based on the verification result $Res_A$.

18. The second trusted third party device according to claim 17, wherein in a process that the second trusted third party device verifies the identity of the second entity identity validity verification device based on $I_B$ after the second trusted third party device receives the message 3 transmitted by the first trusted third party device, the processing unit is further configured to:

extract a public key $P_B$ of the second entity identity validity verification device in a case that $I_B$ is a distinguisher of the second entity identity validity verification device; and check validity of a certificate $Cert_B$ of the second entity identity validity verification device in a case that $I_B$ is the certificate $Cert_B$ of the second entity identity validity verification device.

19. The second trusted third party device according to claim 18, wherein $R_{TPA}$ is replaced with $R_A$.

20. The second trusted third party device according to claim 17, wherein $R_{TPA}$ is replaced with $R_A$.

* * * * *